United States Patent
Iarochenko et al.

(10) Patent No.: US 6,566,000 B1
(45) Date of Patent: May 20, 2003

(54) METAL-AIR BATTERY HAVING IN-SITU GENERATABLE ELECTROLYTE

(75) Inventors: Alexander M. Iarochenko, Toronto (CA); Evgeny B. Kulakov, Electrougli (RU)

(73) Assignee: Eontech Group Inc., Ontario (CA)

( * ) Notice: Subject to any disclaimer, the term of this patent is extended or adjusted under 35 U.S.C. 154(b) by 133 days.

(21) Appl. No.: 09/739,344

(22) Filed: Dec. 19, 2000

(51) Int. Cl.[7] .......................... H01M 12/06; H01M 6/38
(52) U.S. Cl. ......................................... 429/27; 429/116
(58) Field of Search ..................... 429/27, 116, 118; 455/572

(56) References Cited

U.S. PATENT DOCUMENTS

| | | | |
|---|---|---|---|
| 2,450,472 A | * 10/1948 | Dunham et al. | 429/118 X |
| 3,304,202 A | * 2/1967 | Sam | 429/118 |
| 3,532,555 A | 10/1970 | Jerabek et al. | |
| 3,653,972 A | 4/1972 | Bolles | |
| 3,963,519 A | 6/1976 | Louie | |
| 4,087,594 A | 5/1978 | Marincic et al. | 429/90 |
| 4,517,736 A | 5/1985 | Goebel | 29/623.2 |
| 4,842,964 A | 6/1989 | Tarcy | 429/52 |
| 4,968,567 A | * 11/1990 | Schisselbauer | 429/116 X |
| 5,287,554 A | * 2/1994 | Furuno | 455/572 X |
| 5,399,444 A | * 3/1995 | Smith | 429/118 X |
| 5,445,901 A | * 8/1995 | Korall et al. | 429/27 |
| 5,656,876 A | 8/1997 | Radley et al. | 307/150 |
| 5,928,809 A | * 7/1999 | Ju | 455/572 X |

FOREIGN PATENT DOCUMENTS

| | | | |
|---|---|---|---|
| GB | 1 298 812 | 12/1972 | |
| GB | 1505646 | * 5/1975 | H01M/6/38 |
| GB | 1 439 756 | 6/1976 | |
| JP | 56-6384 | * 1/1981 | H01M/6/32 |

* cited by examiner

*Primary Examiner*—Stephen Kalafut
(74) *Attorney, Agent, or Firm*—Morgan, Lewis & Bockius LLP

(57) ABSTRACT

A battery comprising a consumable anode; a gas-diffusion cathode; a non passivated surface-destroying aqueous medium in contact with the anode and cathode; a housing enclosing the anode, cathode and medium; an additive contained within a medium-impermeable chamber separated from but receivable by the medium upon activation to effect mixing of the additive with the medium to provide an electrolytic mixture to effect electrical contact between the anode and cathode; and activation means to effect said activation. The battery provides an extended shelf-life prior to activation by reason that the anode is not corroded by the electrolyte. The battery is of particular use in portable cell-phones, computers, video cameras and players.

17 Claims, 3 Drawing Sheets

METAL-AIR BATTERY HAVING IN-SITU GENERATABLE ELECTROLYTE

FIELD OF THE INVENTION

This invention relates to metal-air electrochemical batteries and fuel cells particularly aluminum-air batteries suitable for electronic devices, including radio-telephones, portable audio and video players, video cameras, and personal computers.

BACKGROUND OF THE INVENTION

There are known electrical rechargeable batteries comprising a housing with a pack of solid state cells, with a converter (controller) for stabilization of the output operating voltage when during the discharge cycle the voltage dips almost to one-half. In U.S. Pat. No. 5,656,876, a battery pack of lithium of NI—Cd solid-state cells is shown, where a DC/DC converter provides a stable operating voltage, possibly also different voltages upon request. U.S. Pat. No. 5,286,578 shows a flexible electrochemical cell having an air cathode, a metallic anode and an electrolyte chamber. The electrolyte chamber is collapsed when the battery is shipped (without electrolyte) to save space. U.S. Pat. No. 5,554,918 shows a mechanically rechargeable battery of a cylindrical shape having a replaceable zinc anode, an air electrode (one option) and housing. A non-spillable electrolyte is contained in the housing. When necessary, the anode can be removed and replaced with a new anode.

Batteries generally degrade during storage due to corrosion of the anode material. The corrosion results in one or more of the following, viz, loss of available energy in the cell, loss of cell voltage, and production of unwanted byproducts.

In order to decrease the corrosion of the anode material, a number of technologies are employed.

In one method, the addition of corrosion control inhibitors to the electrolyte is practiced. U.S. Pat. No. 5,378,559 teaches the addition of phosphate ester to the electrolyte of alkaline cells to reduce unwanted gas production at the anode. However, the addition of corrosion reducing chemicals adds to the cost of the cell and may adversely affect the power output of the cell.

A second approach known as water activation has been to keep the electrolyte separate from the cell until power is needed. U.S. Pat. No. 5,340,662 teaches an emergency battery with an infinite shelf life, wherein the primary battery is kept free of water until needed. U.S. Pat. No. 5,424,147 teaches a water activated battery with an aperture for aqueous liquid addition. U.S. Pat. No. 4,605,604 teaches a nickel-aluminum battery which has active components, but which has electrolyte stored separately. When power is needed the electrolyte must be transferred to the cell for activation. A disadvantage of these methods is that a liquid must be added to the cells before power can be produced. In all cases, additional external space and liquid handling capability must be available. Further, there is added complexity to the cell in order to allow transfer of the electrolyte to the cell and there is also the possibility of leakage due to the external connections for the filling of the electrolyte. Filling of a cell is usually difficult unless a second exit aperture is available to allow escape of the air displaced from the cell cavity.

A third approach has been to keep the electrolyte separate from one or both electrodes but within the cell compartment. The advantage is that no external electrolyte supply is needed. The key factor is that the ionic pathway is kept incomplete and the electrode(s) is kept isolated from the electrolyte. U.S. Pat. No. 3,653,972 teaches a cell in which the electrolyte is housed in a multiplicity of small capsules which keeps the electrolyte separate from the electrodes until the capsules are ruptured. However, the disadvantage of this arrangement is that multiple capsules must be broken and without breaking all of the capsules there will be loss of power due to unused electrolyte. There are also casings of the capsules that interfere with the ionic flow of chemical species in the cell and reduce the power output of the cell.

All of the above batteries suffer from a delay time before becoming active due to electrolyte filling and electrolyte wetting of the anode, cathode and membrane, if present. U.S. Pat. No. 6,136,468 teaches a similar concept of keeping the electrolyte separate from the electrodes by delaying full assembly of the cell until needed, while the electrolyte is immobilized in an adhesive protected by a release agent. Final assembly of the cell allows contact of the electrolyte with the electrodes. While this approach has application with electrolytes that can be immobilized in a gel type state, aqueous electrolytes would be difficult to handle. U.S. Pat. No. 4,059,717 teaches the use of a mask to inactivate a portion of the electrode and reduce corrosion of that masked area. Although battery life may be extended, there is still corrosion loss of the unprotected areas and a need to compensate for the loss in electrochemical activity caused by the mask. U.S. Pat. No. 5,314,502 teaches a electrically driven iontophoretic gate which when activated delivers ions to the cell and allows current to flow in the battery. The complexity of the cell, the electronics needed and the limited range of ions that can be delivered are limitations for this approach.

There is therefore a need for a metal-air battery which does not suffer from the aforesaid prior art disadvantages in providing extended shelf-storage life.

SUMMARY OF THE INVENTION

It is an object of the present invention to provide a metal-air battery having an extended pre-use shelf-storage life.

It is a further object of the present invention to provide such a battery for use, particularly, as a replaceable cartridge, within portable, hand-held cell phones, portable audio and visual players, cameras and the like, and personal computers.

The invention provides a metal-air battery having an extended shelf life by reason that the electrodes are not stored in contact with an electrolytic mixture, which mixture encourages corrosion of the anode until initial activation is desired, whereby the electrolyte is generated in situ to provide electrical contact between the anode and cathode. The battery is constituted in its simplest form as a self-contained cartridge adapted to be received by in electrical communication with, for example, a prior art DC/DC converter in the power receiving unit.

The cartridge is inexpensive and simple to manufacture. The battery with single or multiple anode, cathode and aqueous medium is constructed and sealed ready for use. The anode and cathode are pre-wetted ready for use and activates quickly. A surprising feature is that the battery shelf life is long in this wet state where anode and cathode are in contact with an anode non passivated surface-destroying aqueous medium. The prevention of corrosion is achieved by keeping the non passive film disrupting and film passive disrupting chemical species separated until desired by activation. The passive film disrupting species are contained in one embodiment in a rupturable device until needed in the cell for power production. A substantial reduction in cell complexity is achieved relative to the prior art. The passive disrupting species can be in dry form or concentrated aqueous form so that their in situ storage volume is minimal. The small quantity of passive film disrupting species allows for a small activating means and minimal interface with the operation of the cell. Unlike the cells which contain the electrolyte and have non conductive membranes or containment systems at least equal to the electrolyte volume and which are still present in the cell after rupture, the present invention has only a very small additive-containing chamber, which does not significantly interfere with power generation.

Accordingly, in one aspect the invention provides a battery comprising:
- a consumable anode;
- a gas-diffusion cathode;
- a non passivated surface—destroying aqueous medium in contact with the anode and cathode;
- a housing enclosing the anode, cathode and medium;
- an additive contained within a medium-impermeable chamber separated from but receivable by the medium upon activation to effect release from said chamber and mixing of the additive with the medium to provide an electrolytic mixture to effect electrical contact between the anode and cathode; and
- activation means to effect said activation.

In one embodiment, the chamber is defined in part by a chamber wall formed of a puncturable material and the activation means comprises puncture means to effect puncture of the material upon activation. The puncturable material preferably is formed of a puncturable plastics material or metal in the form of a foil, skin or membrane.

In an alternative embodiment, the chamber is defined in part by a displaceable end wall sealing member and the activation means comprises displacing means to effect displacement of the sealing member to effect mixing of the additive and medium upon activation.

The displacing means further comprises biasing means to effect retraction of the sealing member after activation to effect sealing of the housing.

The anode is preferably formed of aluminum, zinc, magnesium or an alloy thereof.

Preferably, but not limiting, the gas-diffusion cathode comprises copper, more preferably, nickel-free copper i.e., for example, non-nickel-plated copper, in the form of a grid, screen mesh or the like, or bar, rod or plate. Copper alloys, such as for example, brass, may also be used.

A preferred additive comprises an alkali metal hydroxide, most preferably, potassium hydroxide, in the form of a powder, pellet or aqueous solution, which upon activation results in a potassium hydroxide concentration, preferably, of about 4 moles/litre.

By the term "non-passivated surface-destroying aqueous medium" in this specification and claims is meant a medium that, essentially, in the absence of the additive does not affect, i.e. corrode or de-passivate, the anode surface which is passivated by the presence of a metal oxide layer produced by contact with air or oxygen-containing aqueous media.

The preferred aqueous medium in the practice of the invention is de-ionized or distilled ion free-water. However anions, for example, stannate in association with potassium cations may be present, at say a concentration of 0.1–2% w/w.

The aqueous medium preferably has a pH within the range 4–12, most preferably, 5–9.

The medium may further comprise ingredients which cause the medium to be constituted as an aqueous, paste, or the like.

BRIEF DESCRIPTION OF THE DRAWINGS

In order that the invention may be better understood, preferred embodiments will now be described by way of example only with reference to the accompanying drawings wherein.

DETAILED DESCRIPTION OF PREFERRED EMBODIMENTS

Figure 1:
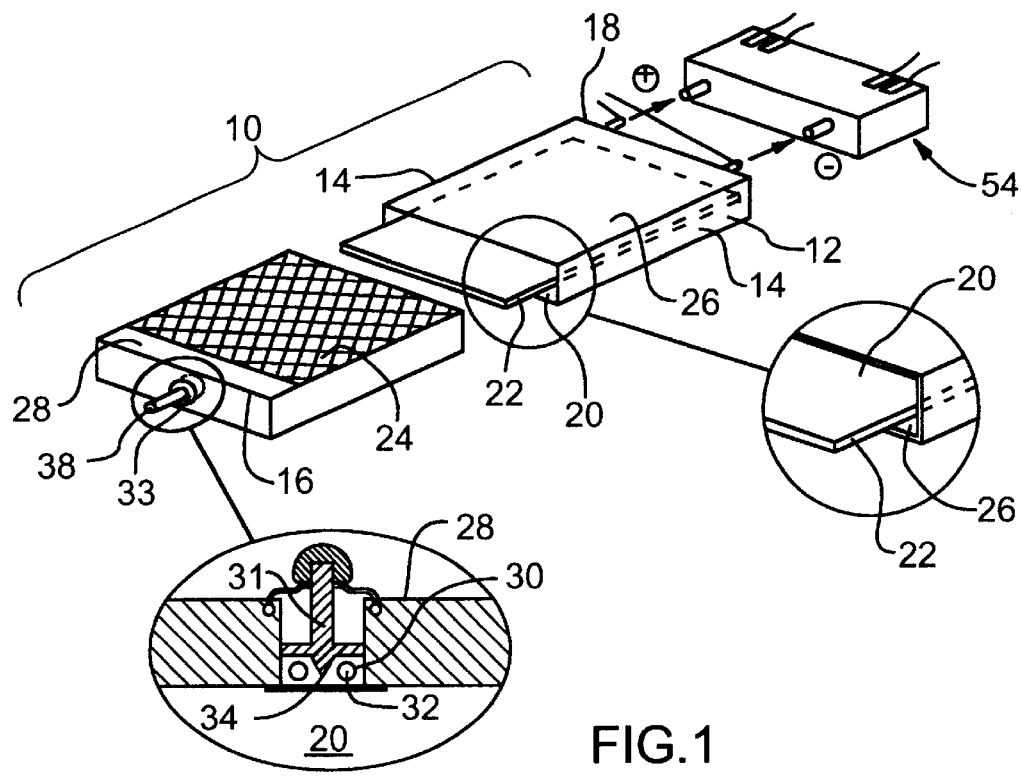
FIG. 1 is a diagrammatic perspective view of a battery cartridge according to the invention in association with a converter.

With reference to FIG. 1, this shows generally as 10 a battery cartridge as a perspective, two halved exploded view. Cartridge 10 has an air-tight plastic housing 12 having side walls 14 and end portions 16, 18 which define an electrolyte chamber 20. Chamber 20 contains a rectangularly-shaped aluminum anode plate 22, flanked by a pair of rectangularly-shaped copper mesh cathodes 24 and an aqueous medium 26. Medium 26 in the pre-activated storage mode is water, but after activation, as hereinafter described, is an aqueous electrolytic medium for example, potassium hydroxide solution at a concentration of about 4M in this embodiment.

End portion 16 consists of a body portion 28 defining a central chamber 30 containing the potassium hydroxide additive 32. Portion 28 defines cylindrical cavity 30, which embraces a centrally located piston-type push rod 31, and has a resiliently flexible plastic outer wall 33 and puncturable inner sealing chamber wall 34 formed as a plastics material membrane. Push rod 31 is operably moveable in continuous sealing engagement with flexible outer wall 33 within cavity 30 to effect rupture of membrane 34 to operably permit contact of additive 32 with medium 26 and, in consequence, produce electrolytic medium. Retraction of rod 31 under the biasing means of flexible material wall 33 maintains waterproof sealing of electrolyte chamber 20. Thus, in this specification, the term "activation" means the in situ production of the electrolytic medium within cartridge 10, as hereinbefore exemplified.

Figure 2:
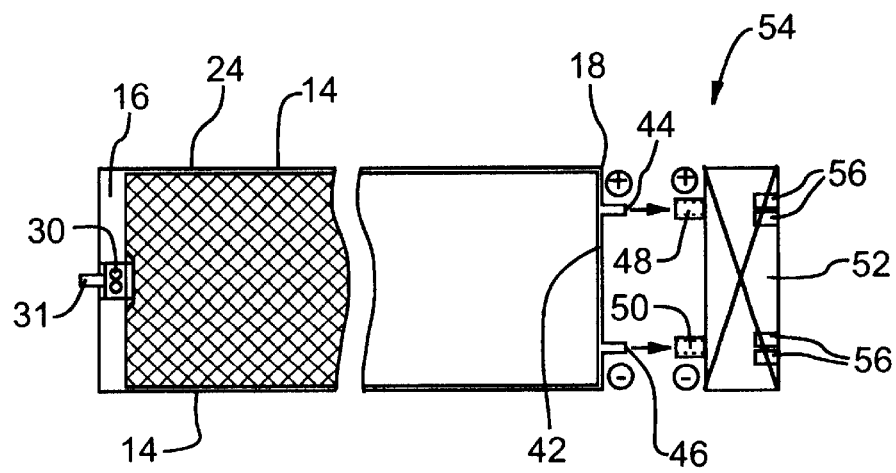
FIG. 2 is a diagrammatic plan view of the cartridge and converter of FIG. 1.
Figure 3:
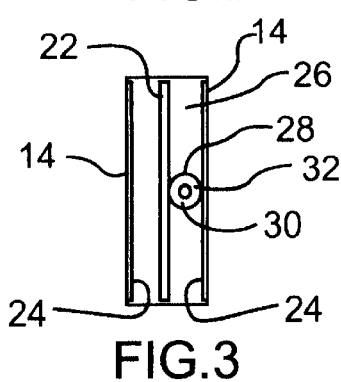
FIG. 3 is an end view of the cartridge shown in FIG. 1.

FIG. 2 represents a diagrammatic plan view of cartridge 10 embodiment shown in FIG. 1, whereas FIG. 3 represents a diagrammatic end view at end portion 16 of cartridge 10.

Figure 4:
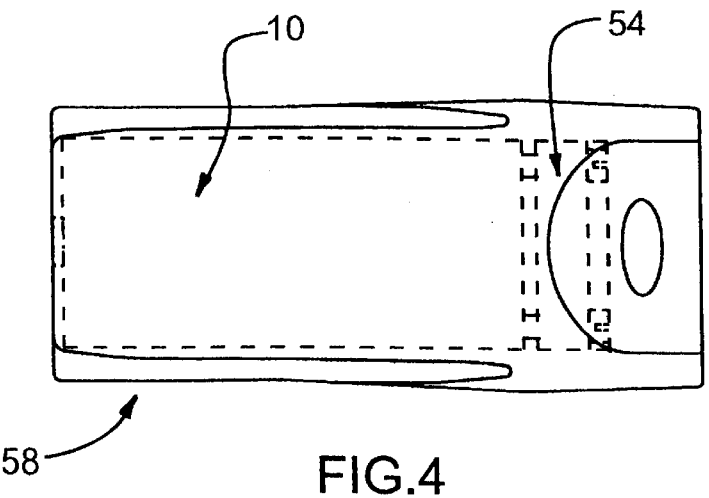
FIG. 4 is a diagrammatic side view of the cartridge and converter assembly within a retaining casing.
Figure 5:
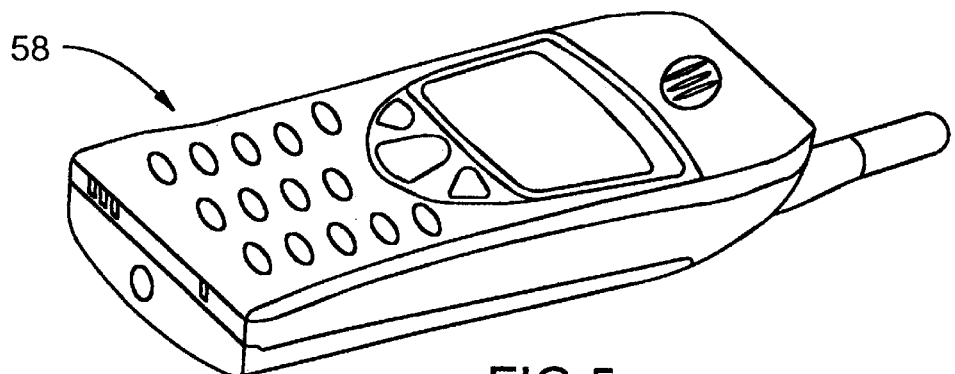
FIG. 5 is a diagrammatic perspective view of a hand-held portable cell phone according to the invention.

End portion 18 consists of a body 42 having a pair of metallic electrode prongs constituting an anode connector 44 and cathode connector 46 extending therethrough to the, respective, anode plate 22 and cathode mesh 24. Connectors 44 and 46 extend from body 42 and are adapted to be received by an anode terminal socket 48 and a cathode terminal socket 50 extending from a complementary rectangularly-shaped body 52 of a DC/DC converter shown generally as 54. Converter 54 has a pair of metallic electrical contact plates 56 at a face portion 58 distal of sockets 48, 50, which plates 56 are in electrical contact with cell phone power receiver shown generally as 58 in FIGS. 4 and 5.

Figure 6:
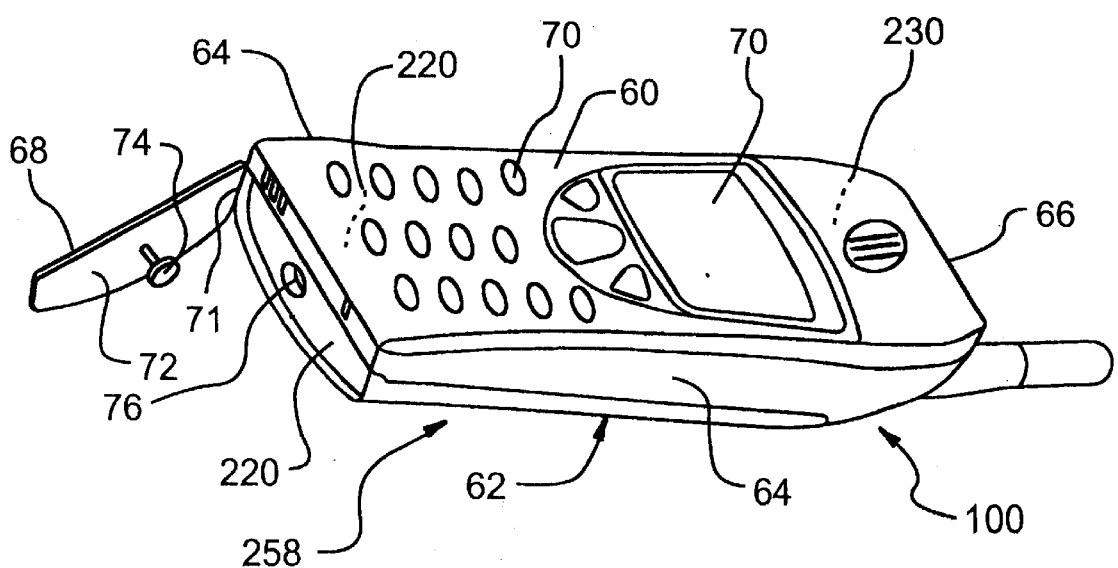
FIG. 6 is a diagrammatic perspective view of an alternative embodiment of a portable cell phone according to the invention.
Figure 7A:
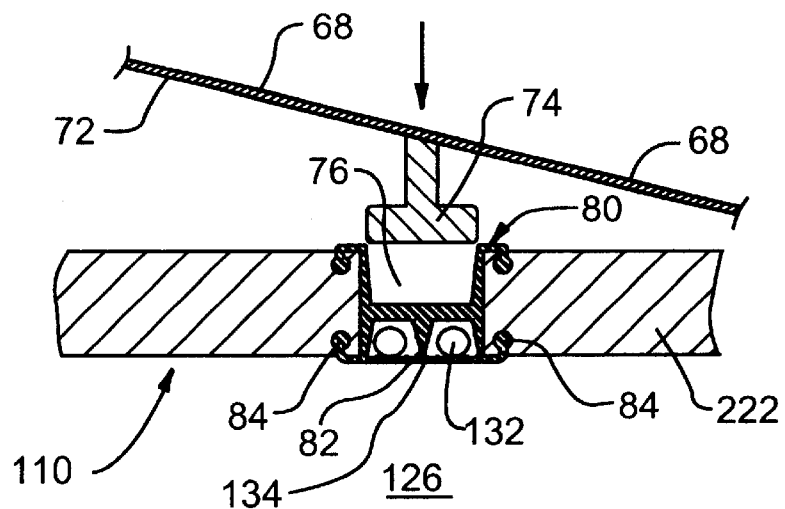
FIGS. 7A and 7B are diagrammatic longitudal sectional views of an embodiment of an activation means of use in the practice of the invention.
Figure 7B:
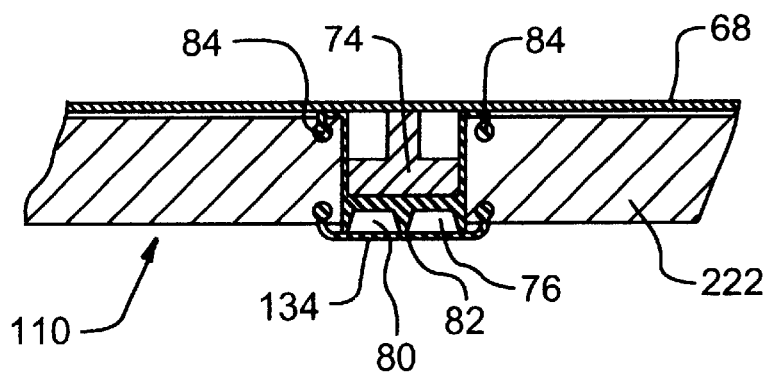

In an alternative embodiment showing alternative activation means, reference is made to FIG. 6, FIGS. 7A and 7B.

Portable cell phone, shown generally as 258, comprises a plastics housing shown generally as 100 within which is received cartridge 220 and converter 230, in close engagement. Housing 100 has a front wall member 60, a back wall member 62, a pair of side members 64, top end member 66 and battery cover bottom end member 68. Front wall 60 is so shaped as to provide suitable apatures to allow of visual display of features 70.

With reference also to FIGS. 7A and 7B, bottom end member 68 is hinged to an edge 71 of side member 64. Centrally disposed on the inner face 72 of end member 68 is an integrally formed button 74 receivable within a complimentary chamber 76 defined by a central portion of cartridge 110. Within chamber 76 is an H-shaped, in vertical section, rupture member 80 of alkaline resistant flexible material having a metallic cutting portion 82 embedded therein as hereinbefore described with reference to FIGS. 1–3. Member 80 is retained within chamber 76 by integrally formed terminal clip portions 84 of member 80, held within inner and outer recesses of cartridge end portion 222. FIG. 7A shows the cell phone assembly with cartridge 110 within housing 100 prior to rupture and release of potassium hydroxide pellets 132 into aqueous medium 126. FIG. 7B shows the post-rupture and operational mode of the recharged cell phone. Only inner membrane of foil type sealing member 134 has been ruptured, whereas member 80 still provides full sealing engagement within chamber to prevent escape or seepage of electrolyte out of the cartridge chamber.

Figure 8:
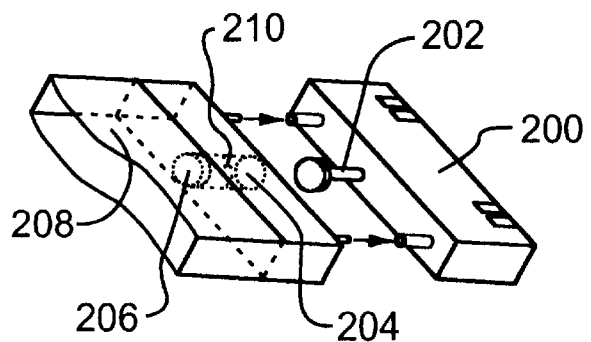
FIG. 8 is a perspective view, in part, of an embodiment having an alternatively located activation means; and wherein the same numerals denote like parts.

FIG. 8 shows converter 200 having a piston-heated type plunger 202 adapted to be received within a cartridge chamber 204 to effect rupture of a sealing membrane 206 at the inner face of aqueous medium chamber 208 by the cutting means of H-shaped sealing member 210 in an analogous manner as hereinbefore described.

EXAMPLE

The following example illustrates that a non-passivated surface-destroying aqueous medium in contact with an anode and cathode can be stored with no anode corrosion until an electrolytic mixture is allowed to effect electrical contact between the anode and cathode.

An aluminum anode of mass 12.45 g was inserted into a cartridge as described with reference generally to aforesaid FIGS. 1–3 having two metal-air cathodes. The free volume of the cartridge chamber of the cartridge was 32.4 mL. With the aluminum anode present. The free volume of the cartridge chamber was filled with an aqueous medium consisting of 0.06 molar sodium stannate and water at pH 8.0. The time immediately after insertion of the anode was defined as time 0. A small Teflon™ (polytetrafluoroethylene) tube connected to the top of the cartridge was directed to a gas collecting water filled manometer. Evidence of corrosion of the anode would be demonstrated by the formation of gas in the cartridge and delivery of the gas to the water filled manometer. The water level in the manometer at time zero was 45.0 mL. No gas bubbles were observed and subsequent liquid readings as recorded in the Table below shows that no gas was produced by the anode in contact with the aqueous medium. At the end of this part of the experiment, the anode was carefully removed from the cartridge and reweighed. There was no mass loss of the anode plate confirming that there was no corrosion of the anode in contact with the aqueous medium.

A small quantity of electrolyte contained in a polyethylene thin film bag was inserted into the aqueous medium. The electrolyte was 7.29 g of KOH sufficient to give a 4 M KOH concentration in the cartridge when fully mixed. The plastic film was punctured with a hypodermic needle allowing the electrolyte to contact the aqueous medium and cathode. The anode was quickly reinserted into the cartridge to thereby reseal the cartridge. The time and liquid level measurements were restarted.

Gas evolution was immediately seen in the form of bubbles from the end of the Teflon™ tube. The drop in manometer liquid level is clearly seen from the readings in the Table. When the manometer was almost empty, the experiment was terminated and the anode carefully removed from the cartridge and reweighed. The mass loss of the anode was 0.0209 g to show that corrosion had occurred.

| Time | Manometer volume | Time after electrolyte Container punctured (s) | Manometer volume |
| --- | --- | --- | --- |
| 0 | 0 | 0 | 0 |
| 300 s | 0 | 480 | 2.90 ml |
| 600 s | 0 | 660 | 4.55 ml |
| 900 s | 0 | 1260 | 7.15 ml |
| 1500 s | 0 | 2880 | 16.4 ml |
| 3780 | 0 | 4200 | 24.10 ml |
| | | 6960 | 41.25 ml |

The results show that the corrosion of the aluminum in 4 M KOH +0.06 M sodium stannate was appreciable. The reaction produced hydrogen gas which was measured by volume in a water filled manometer. The results also show that the aqueous media, water plus activating salts, can be allowed to contact the anode and cathode provided that anode passive film-destroying species, such as potassium hydroxide are kept from mixing with the aqueous media.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A battery comprising:
   a consumable anode;
   a gas-diffusion cathode;
   a non passivated surface—destroying aqueous medium in contact with the anode and cathode;
   a housing enclosing the anode, cathode and medium;
   an additive contained within a medium-impermeable chamber separated from but receivable by the medium upon activation to effect release from said chamber and mixing of the additive with the medium to provide an electrolytic mixture to effect ionic contact between the anode and cathode; and
   activation means to effect said activation.

2. A battery as claimed in claim 1 wherein said chamber is defined in part by a chamber wall formed of a puncturable material and said activation means comprises a puncture member within said chamber means to effect puncture of said puncturable material upon activation.

3. A battery as claimed in claim 2 wherein said puncturable material is formed of a plastics material or metal in the form of a foil, skin or membrane.

4. A battery as claimed in claim 1 wherein said chamber is defined in part by a displaceable end wall sealing member and said activation means comprises displacing means to effect displacement of said sealing member to effect mixing of said additive and said medium upon activation.

5. A battery as claimed in claim 4 wherein said displacing means further comprises biasing means to effect retraction of said sealing member after activation to effect sealing of said housing.

6. A battery as claimed in claim 1 wherein said anode is formed of aluminum, zinc, magnesium, or an alloy thereof.

7. A battery as claimed in claim 1 wherein the cathode comprises copper.

8. A battery as claimed in claim 7 wherein said cathode is nickel-free.

9. A battery as claimed in claim 1 wherein said container is formed of a plastics material.

10. A battery as claimed in claim 1 wherein said housing is air-tight.

11. A battery as claimed in claim 1 wherein the additive comprises an alkali metal hydroxide or halide.

12. A battery as claimed in claim 11 wherein the additive is potassium hydroxide.

13. A battery as defined in 1 wherein said medium is de-ionized water.

14. A battery as defined in claim 1 wherein said aqueous medium has a pH in the range of 4–12.

15. A battery as defined in claim 1 constituting a self-contained cartridge adapted to be replaceably received by a base unit comprising a body and a DC/DC converter.

16. A hand-held portable cell phone containing a battery and DC/DC converter as claimed in claim 15.

17. A battery comprising:
  a consumable anode;
  a gas-diffusion cathode;
  a non passivated surface—destroying aqueous medium in contact with the anode and cathode;
  a housing enclosing the anode, cathode and medium;
  an additive contained within a medium-impermeable chamber separated from but receivable by the medium upon activation to effect release from said chamber and mixing of the additive with the medium to provide an electrolytic mixture to effect ionic contact between the anode and cathode; and
  activation means to effect said activation, said housing having a body portion which defines said medium-impermeable chamber.

* * * * *